United States Patent [19]

Pemberton

[11] Patent Number: 4,947,645
[45] Date of Patent: Aug. 14, 1990

[54] EXHAUST EFFICIENCY INCREASING APPARATUS

[76] Inventor: Joseph H. Pemberton, 801 E. Main, Artesia, N. Mex. 88210

[21] Appl. No.: 388,240

[22] Filed: Jul. 31, 1989

[51] Int. Cl.5 .............................................. F02B 27/02
[52] U.S. Cl. .......................................... 60/313; 60/323
[58] Field of Search .................................... 60/313, 323

[56] References Cited

FOREIGN PATENT DOCUMENTS

| | | | |
|---|---|---|---|
| 170815 | 10/1983 | Japan | 60/313 |
| 178820 | 10/1983 | Japan | 60/323 |
| 212622 | 9/1986 | Japan | 60/313 |
| 1025906 | 6/1983 | U.S.S.R. | 60/313 |

Primary Examiner—Douglas Hart
Attorney, Agent, or Firm—Robert W. Weig; Deborah A. Peacock

[57] ABSTRACT

The disclosure is directed to an exhaust efficiency increasing apparatus incorporating crossover ducts between dual exhaust conduits extending from an engine having two cylinder banks. The ducts are disposed to communicate with upstream entry and downstream exit apertures on the exhaust conduits and cross in an "X". Since where the ducts are positioned affects engine torque, torque curves can be adjusted or changed by placing the crossover ducts near one end of a housing which is placed in the exhaust system and which can be reversed, end-to-end, to position the crossover ducts nearer to or further from the engine.

13 Claims, 3 Drawing Sheets

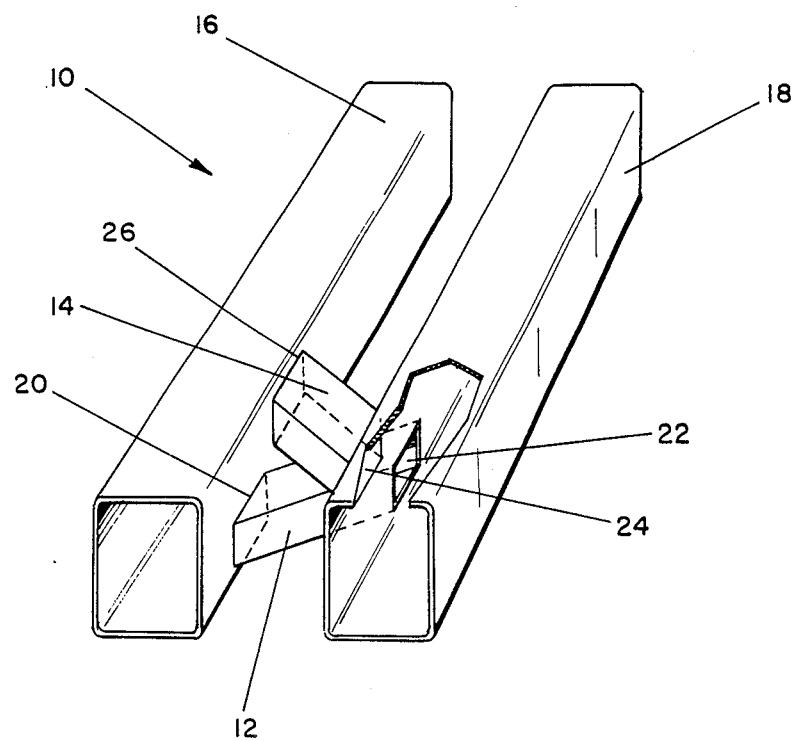
FIG—1
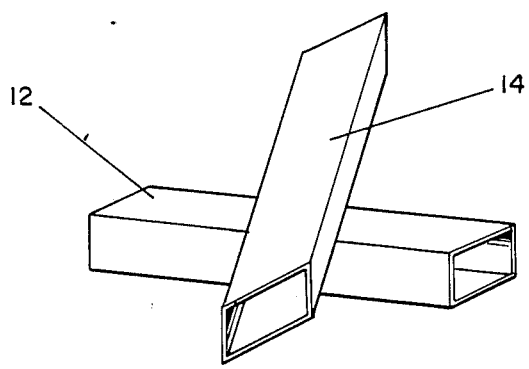
FIG—2

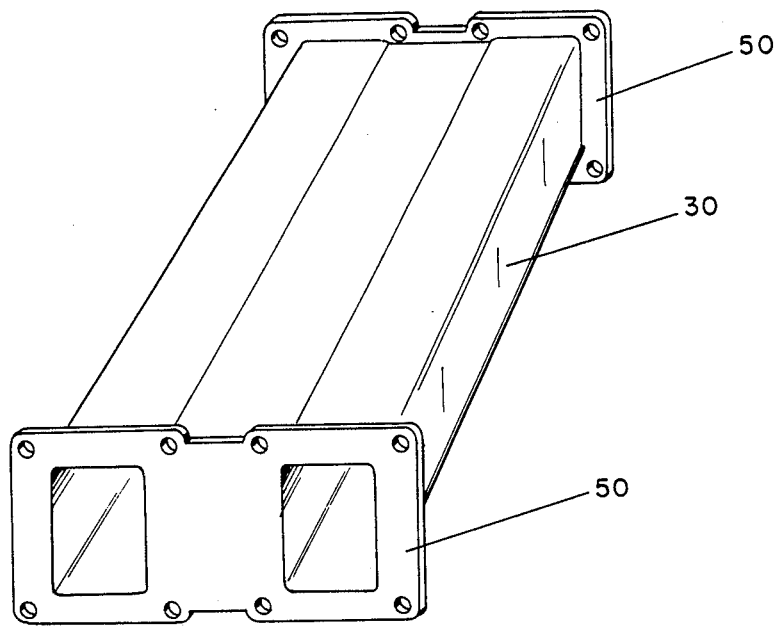
FIG—3
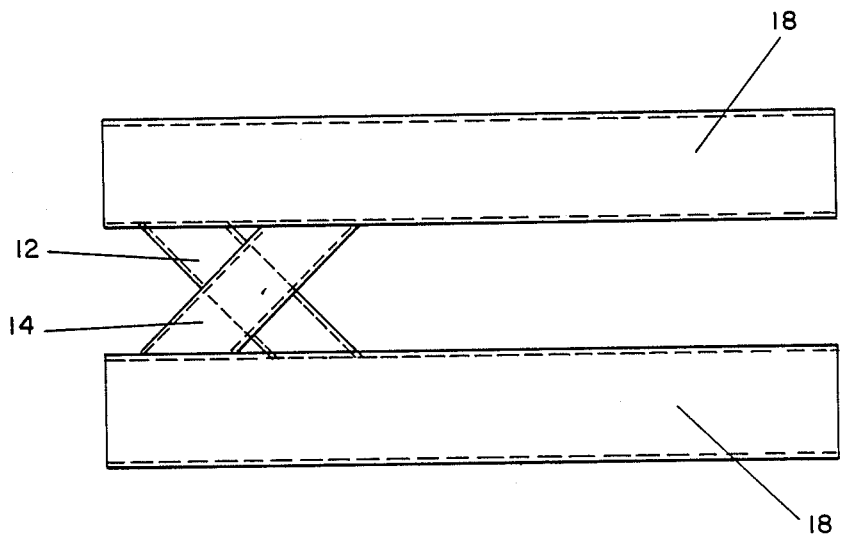
FIG—4

EXHAUST EFFICIENCY INCREASING APPARATUS

FIELD OF THE INVENTION

The invention relates to increasing power and torque through increasing exhaust efficiency in internal combustion engines having two banks of cylinders and more particularly to an apparatus for cross-communicating between the exhaust conduits from each of the banks of cylinders to increase the power output of the engine and control its torque curve.

BACKGROUND OF THE INVENTION

Although much thought has gone into designing intake systems for existing internal combustion engines, the primary consideration for designing exhaust systems has been cost. However, just as the induction of gases into internal combustion engines is important, the extraction of gases is equally important.

The construction of an exhaust system should compliment the requirements of the engine. Diameter, length, and culmination of exhaust runners into one collector can significantly influence efficiency through pressure equalization and scavenging of the exhaust gases.

in V-8s, V-6s, and the like, automobile manufacturers at present typically use "crossover" pipes which provide pressure equalization between the two existing pipes exhausting gases from two cylinder banks.

In practicing the invention, an adjustable crossover apparatus is provided. It can be configured to provide desired torque characteristics for a particular engine or for a selected use and can be incorporated into the exhaust system of the engine. For example, more torque is usually needed for loaded conditions than for non-loaded conditions. Thus, more torque is needed for going uphill than downhill, and for towing a trailer than for not pulling a trailer.

SUMMARY OF THE INVENTION

In accordance with the present invention, there is provided an apparatus for increasing exhaust efficiency for an internal combustion engine having two banks of cylinders, a left bank and a right bank, there being a separate exhaust conduit from each bank, a left exhaust conduit and a right exhaust conduit, respectively. The apparatus comprises first structure for communicating from the left exhaust conduit to the right exhaust conduit, the first communicating structure extending from a position on the left conduit a selected distance from the left cylinder bank to a preselected position on the right exhaust conduit, the preselected position on the right exhaust conduit being further from the right cylinder bank than the selected position on the left exhaust conduit is from the left cylinder bank. A second structure is provided for communicating from the right exhaust conduit to the left exhaust conduit, the second communicating structure extending from a position on the right conduit a selected distance from the right cylinder bank to a preselected position on the left exhaust conduit, the preselected position on the left exhaust conduit being further from the left cylinder bank than the selected position on the right exhaust conduit is from the right cylinder bank. Means for positioning the first and second structures on the exhaust conduits a predetermined distance from the cylinder banks is also provided. The first and second communicating structures preferably comprise first and second fluid conducting structure such as ducts. Each of the fluid conducting structures can comprise one or more ducts. The cross-sectional areas of the ducts are preferably substantially smaller than the cross-sectional areas of the exhaust conduits and cross over one another such as in an "x" configuration. The first and second ducts are preferably substantially of the same length and of the same cross-sectional area and thereby substantially of the same size. The cross-sectional configurations of the ducts can be rectangular, circular, oval, or of other selected cross-section, such as that of the well-known National Aeronautics and Space Administration (NASA) duct shape. The entry and exit apertures of the duct can be larger and smaller, respectively. The ducts preferably cross at between about 40° and about 50°, and most preferably at about 45°. The apparatus of the invention will affect the torque curve of the engine depending upon where it is placed on the exhaust system in terms of distance from the cylinder banks. Furthermore, the apparatus of the invention can be incorporated within a housing which is reversible to provide a user with a placement selection of one of two distances from the cylinder banks to provide two torque curves for the engine.

One object of the invention is to increase exhaust efficiency in an internal combustion engine having two banks of cylinders.

A second object of the invention is to increase power output in an internal combustion engine having two banks of cylinders.

A third object of the invention is to provide an adjustable or controllable torque curve for an internal combustion engine having two banks of cylinders.

One advantage of the present invention is that power output of an internal combustion engine is substantially increased utilizing the invention.

Another advantage of the present invention is that engine torque curves can be readily changed and adjusted using an apparatus in accordance with the present invention.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention.

FIG. 1 illustrates a preferred embodiment of the invention incorporatable in a dual exhaust system emanating from an internal combustion engine having two banks of cylinders, each of which has its own exhaust conduit;

FIG. 2 shows the communicating ducts of the preferred embodiment of FIG. 1;

FIG. 3 depicts the preferred embodiment in place in a reversible housing for use in a dual system;

FIG. 4 is a top view of the FIG. 1 preferred embodiment; and

DETAILED DESCRIPTION OF A PREFERRED EMBODIMENT OF THE INVENTION

Figure 5:
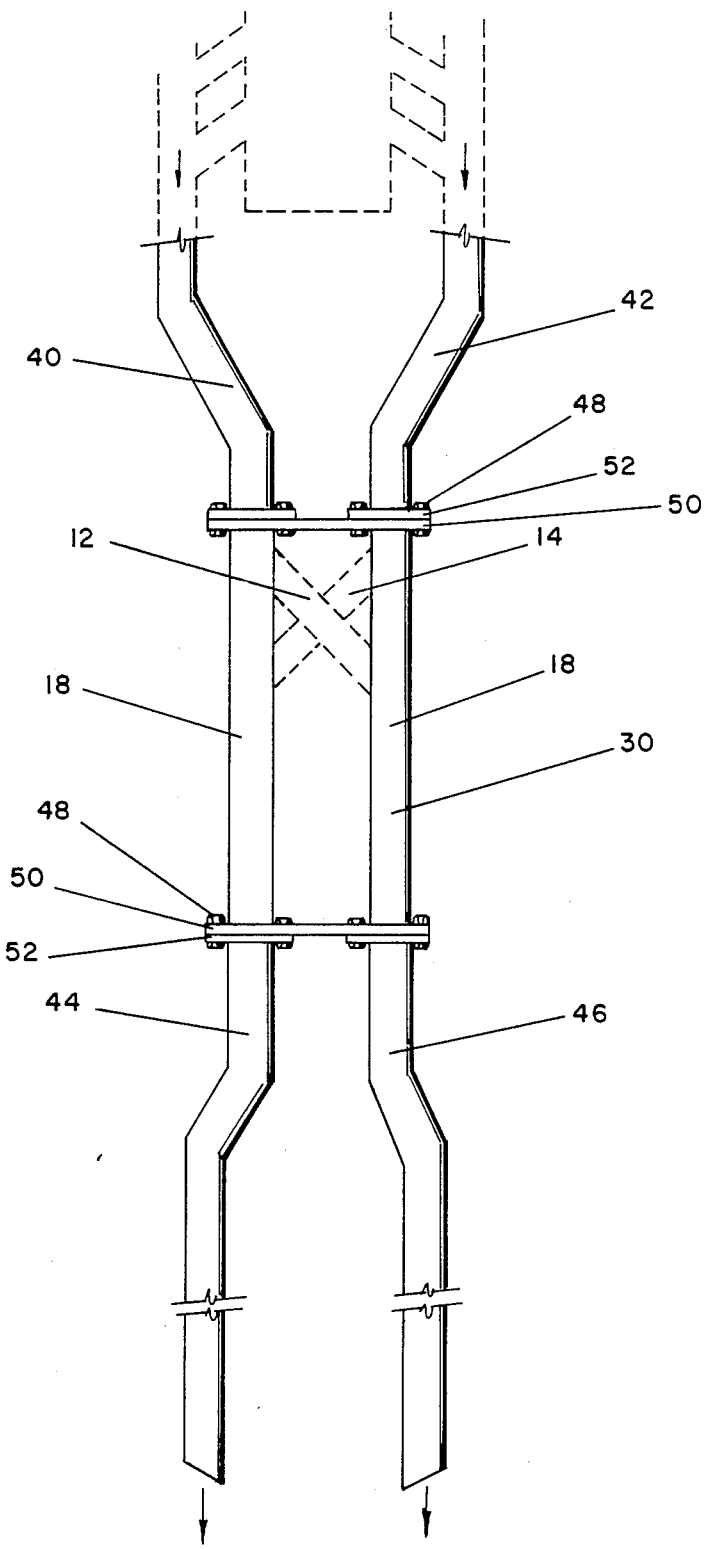
FIG. 5 shows the FIG. 3 embodiment in place in an exhaust system.

Reference is now made to FIG. 1 which illustrates a preferred embodiment of the invention 10 comprising crossing hollow ducts 12 and 14 which form an "x" configuration between two separate exhaust conduits 16 and 18 in a dual exhaust system of a vehicle having an internal combustion engine having two cylinder banks, such as a V-6, a V-8, or an opposing configuration, such as in a 4-cylinder Porsche or Volkswagen. In practicing the invention, the cross-sectional areas of the ducts 12 and 14 are preferably substantially smaller than the cross-sectional areas of the exhaust conduits 16 and 18. Uniquely and significant to improved efficiency utilizing the invention, duct 12 connects to right exhaust conduit 16 closer to the cylinder bank from which exhaust gases flow than it connects to left exhaust conduit 18. Therefore, the exhaust gases from the right conduit 16, as indicated by the arrow, flow through crossover duct 12 into conduit 18. Similarly, exhaust gases from the left cylinder bank flow through exhaust conduit 18 and through crossover duct 14 into conduit 16. Crossover duct 12 connects through an aperture 20 in conduit 16 to an aperture 22 in conduit 18. Crossover duct 14 connects through an aperture 24 in left exhaust conduit 18 to an aperture 26 in right exhaust conduit 16. Ducts 12 and 14 are typically welded in place. In accordance with the invention, each duct effectively connects from a relatively upstream postion on one exhaust to a downstream position on the other exhaust. In practicing the invention, it is preferable that both the left and right exhaust conduits be of essentially the same length and matched or, substantially or operationally, mirror-images of one another. Although in the preferred embodiment, the crossover ducts 12 and 14 form a simple "x," as seen in FIG. 4, those skilled in the art will appreciate that the ducts could be otherwise configured. For example, they could be curved, bent into "elbows," be made longer and wrap around either of the exhaust conduits or the like.

Significantly, the distance at which the crossover ducts of the apparatus of the invention are disposed downstream from the headers, or exhaust manifolds from the left and right cylinder banks, will affect the torque curve of the engine. When they are positioned closer to the engine, the torque curve experiences relatively higher low end torque. When the crossover ducts of the exhaust apparatus are placed further from the engine, the engine produces greater high end torque. FIG. 3, shows the preferred embodiment of the invention disposed in a housing 30 which is reversible on an exhaust system so that either increased low end or increased high end torque can be produced. FIG. 4 shows a top view of the FIG. 1 embodiment as disposed in housing 30, seen in FIG. 3. FIG. 5 shows the housing 30 in place in a typical dual exhaust system connected to forward exhaust pipe sections 40 and 42 and rear exhaust pipe sections 44 and 46, using bolts 48 and flanges 50 and 52.

In practicing the invention, the angle at which the crossover ducts 12 and 14 exit and enter the exhaust conduits may be varied to provide optimum performance for a particular engine and exhaust system configuration. Furthermore, the ducts 12 and 14 need not be straight, but could be curved in s-curves, c-curves, or the like. Experimentation by practitioners in the art will provide optimal entry and exit angles, optimal crossover duct size, and taper, if any, and optimal crossover duct length relative to exhaust conduit size, length, and configuration for particular applications in accordance with generally or well known engineering principles.

The preferred embodiment of the invention assisted in dramatically increasing the power output of a 350 CID tuned port injection Corvette V-8 engine. Engine output, as measured on a dynometer, was increased by 25 horsepower utilizing the invention, over the power output of the same system without it. In addition, the torque curve is variable using the end-to-end reversible housing of FIG. 4.

Location of catalytic converters in today's systems varies, some having one converter and others having as many as three. On a typical three-converter system, there are two "pup" converters located immediately after the exhaust manifold flange. The third and last converter is usually mounted midstream in the exhaust system. At the point of the large midstream converter, the right and left exhaust pipes converge into one. It could therefore be necessary to install an apparatus in accordance with the invention between the rear of the engine and in front of the converter. However, the optimum location of the floating crossover is preferably immediately behind where right and left bank pipes come close enough to each other to do so.

Although due to manufacturing design and cost requirements, a compromise system is more likely to interest manufacturers, the crossover system of the invention seems to optimally increase efficiency and horsepower when located in the "hot spot" of an exhaust system, i.e., where the exhaust temperature is highest.

Those skilled in the art will appreciate that although multiple crossovers added to the exhaust system after an initial crossover may have diminishing results, strategically placed multiple crossovers can deliver a broad torque range and good results in high and low RPM ranges.

The cross-sectional configuration of the exit and entry and apertures 20, 22, 24, and 26 of the crossover ducts 12 and 14 shown in FIG. 1 can be designed to encourage smooth gas flow. Apertures of the well known NASA duct design with the small part of the duct to the front and large part to the rear are very satisfactory. Exit ducts are preferably oppositely positioned, with the large part of the aperture to the rear and the small part to the front.

The entry and exit apertures can also vary in size with the entry aperture significantly larger than the exit aperture.

An approximate angle of between about 40° and 50°, and preferably about 45° of crossover ducts to the exhaust conduits provides excellent right and left bank pressure equalization in the preferred embodiment.

Vacuum conditions of an engine are directly related to torque, so the apparatus of the invention can be adapted by those skilled in the art to respond to a change in vacuum by means of state-of-the-art electronics.

The invention has been described in detail with particular reference to a preferred embodiment thereof, but it will be understood that variations and modifications can be effected within the scope of the invention.

What is claimed is:

1. An apparatus for increasing exhaust efficiency for an internal combustion engine having two banks of cylinders, a left bank and a right bank, there being a separate exhaust conduit from each bank of cylinders, a left exhaust conduit and a right exhaust conduit, respectively, the apparatus comprising:

first means for communicating from the left exhaust conduit to the right exhaust conduit, said first communicating means extending from a position on the left conduit a selected distance from the left cylinder bank to a preselected position on the right exhaust conduit, said preselected position on the right exhaust conduit being further from the right cylinder bank than the selected position on the left exhaust conduit is from the left cylinder bank;

second means for communicating from the right exhaust conduit to the left exhaust conduit, said second communicating means extending from a position on the right conduit a selected distance from the right cylinder bank to a preselected position on the left exhaust conduit, said preselected position on the left exhaust conduit being further from the left cylinder bank than the selected position on the right exhausted conduit is from the right cylinder bank; and means for positioning said first and second means on the exhaust conduits a predetermined distance from the cylinder banks.

2. The invention of claim 1 wherein said first and second communicating means comprise first and second fluid conducting means, respectively.

3. The invention of claim 2 wherein said first and second fluid conducting means comprise first and second ducts.

4. The invention of claim 3 wherein said ducts comprise cross sectional areas substantially smaller than the cross sectional areas of the exhaust conduits.

5. The invention of claim 3 wherein said first and second ducts cross over one another.

6. The invention of claim 4 wherein said ducts cross over one another in an "x" configuration.

7. The invention of claim 4 wherein said first and second ducts are of substantially the same length.

8. The invention of claim 4 wherein said first and second ducts are of substantially the same cross sectional area.

9. The invention of claim 4 wherein said first and second ducts are of substantially the same size.

10. The invention of claim 4 wherein said first and second ducts comprises essentially rectangular cross sections.

11. The invention of claim 4 wherein said first and second ducts enter and exit said left and right exhaust conduits at an angle thereto between about 40° and about 50°.

12. The invention of claim 1 wherein said means for positioning said first and second communicating means comprises means for selectively positioning said first and second means on the exhaust conduits at more than one distance from the cylinder banks in order to affect the torque curve of the engine.

13. The invention of claim 12 wherein said first and second communicating means comprise ducts and wherein said invention further comprises means for housing said ducts near one end thereof, whereby said housing means is reversibly engageable with the exhaust conduits to provide two duct distances from the cylinder banks and thereby two torque curves for the engine.

* * * * *